Figure 1:
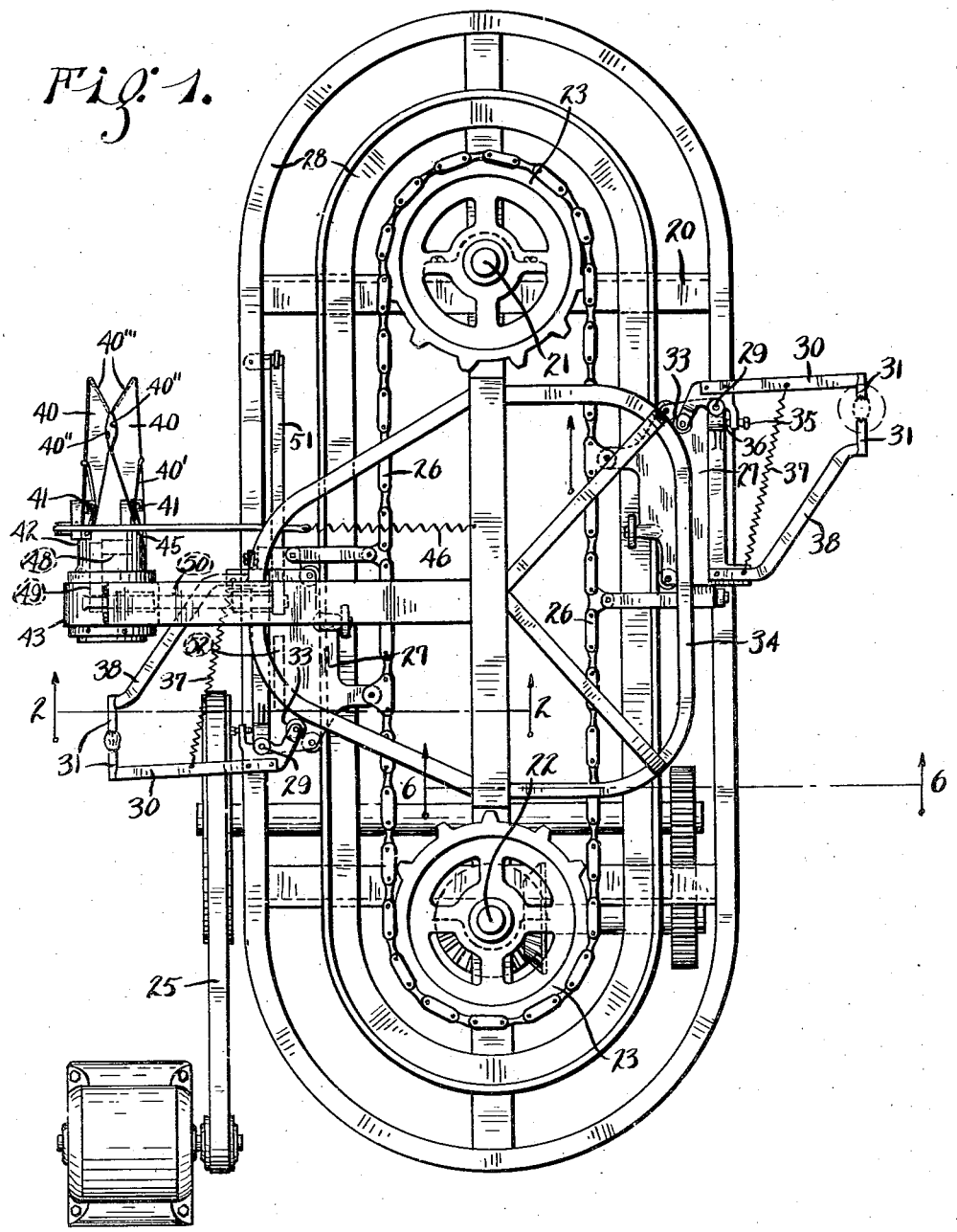

June 12, 1945.   R. POLK, SR., ET AL   2,378,101
METHOD AND MEANS FOR TREATING FRUIT HAVING PITS
Filed Sept. 12, 1941   5 Sheets-Sheet 1

INVENTOR.
RALPH POLK SR. AND
RALPH POLK JR.,
BY Hood & Hahn
ATTORNEYS.

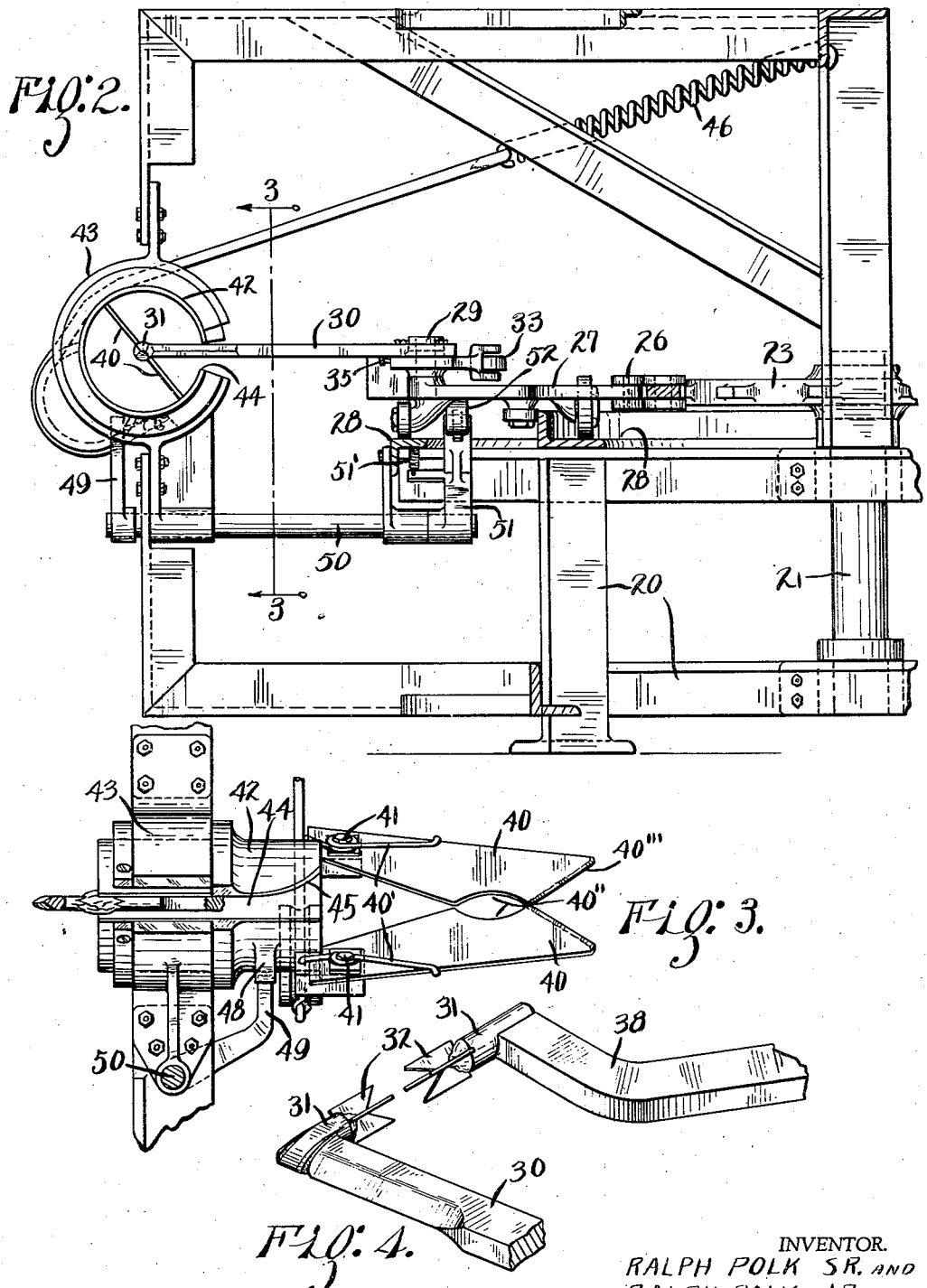

June 12, 1945.   R. POLK, SR., ET AL   2,378,101
METHOD AND MEANS FOR TREATING FRUIT HAVING PITS
Filed Sept. 12, 1941   5 Sheets-Sheet 3
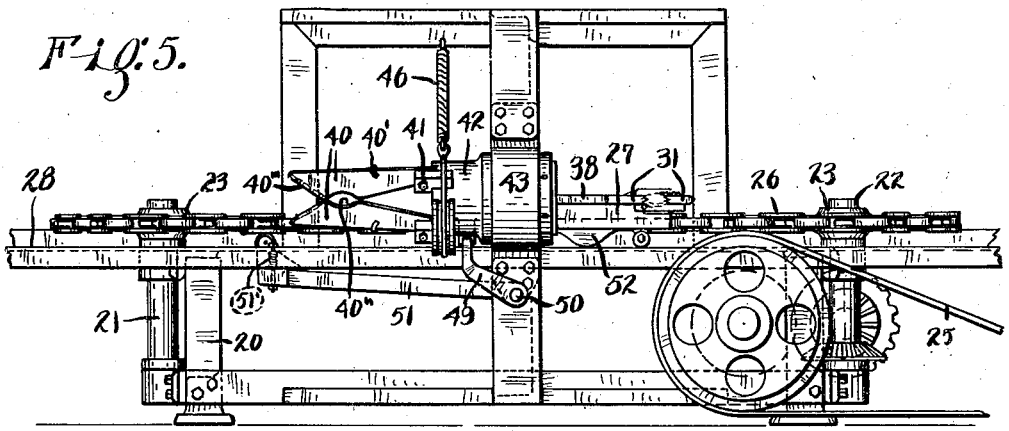
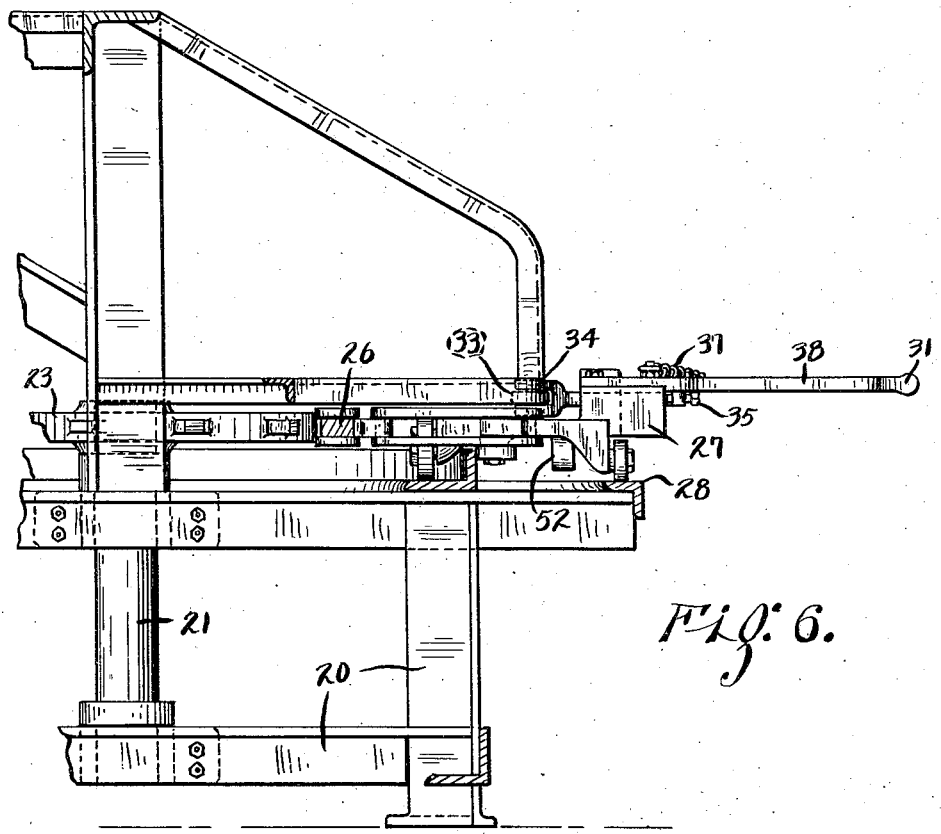
INVENTOR.
RALPH POLK SR. AND
RALPH POLK JR.,
BY Hood & Hahn
ATTORNEYS June 12, 1945.   R. POLK, SR., ET AL   2,378,101
METHOD AND MEANS FOR TREATING FRUIT HAVING PITS
Filed Sept. 12, 1941   5 Sheets-Sheet 4
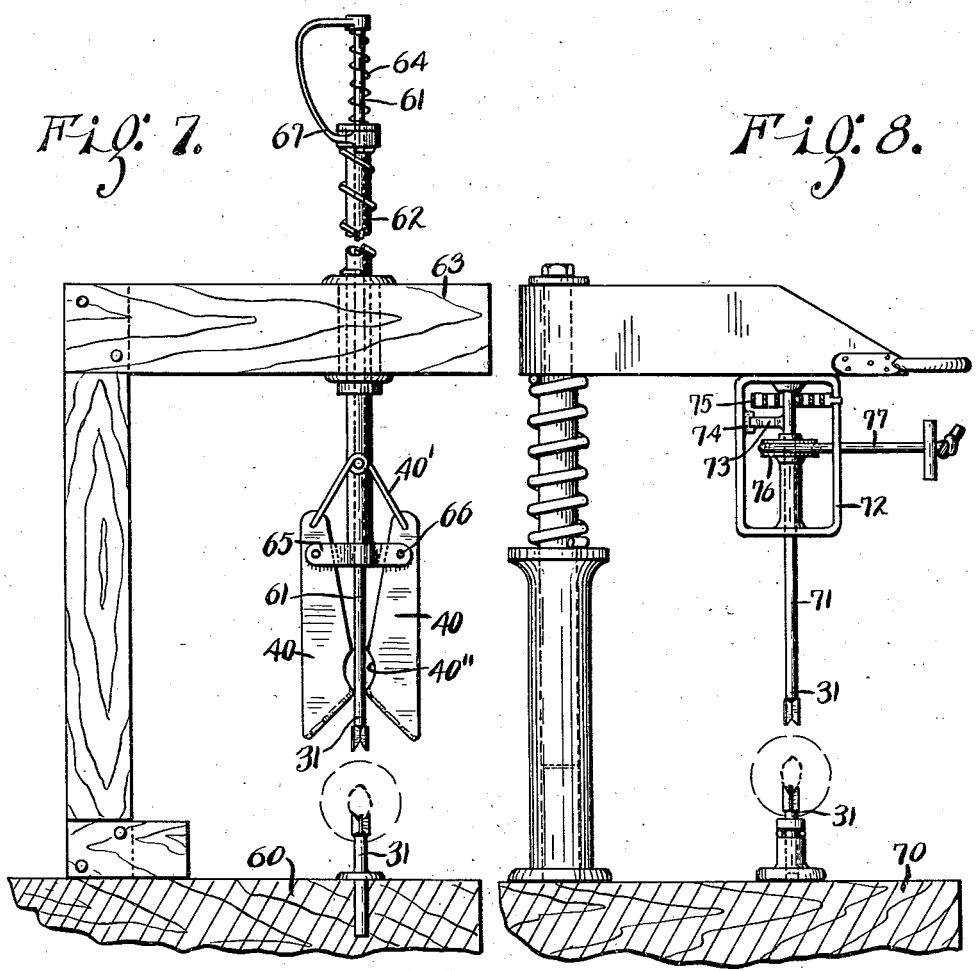
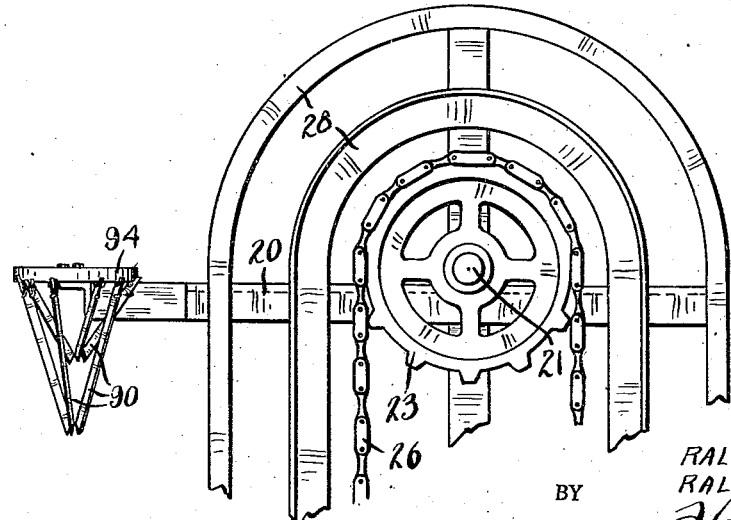
INVENTOR.
RALPH POLK SR. AND
RALPH POLK JR.,
BY Hood & Hahn.
ATTORNEYS

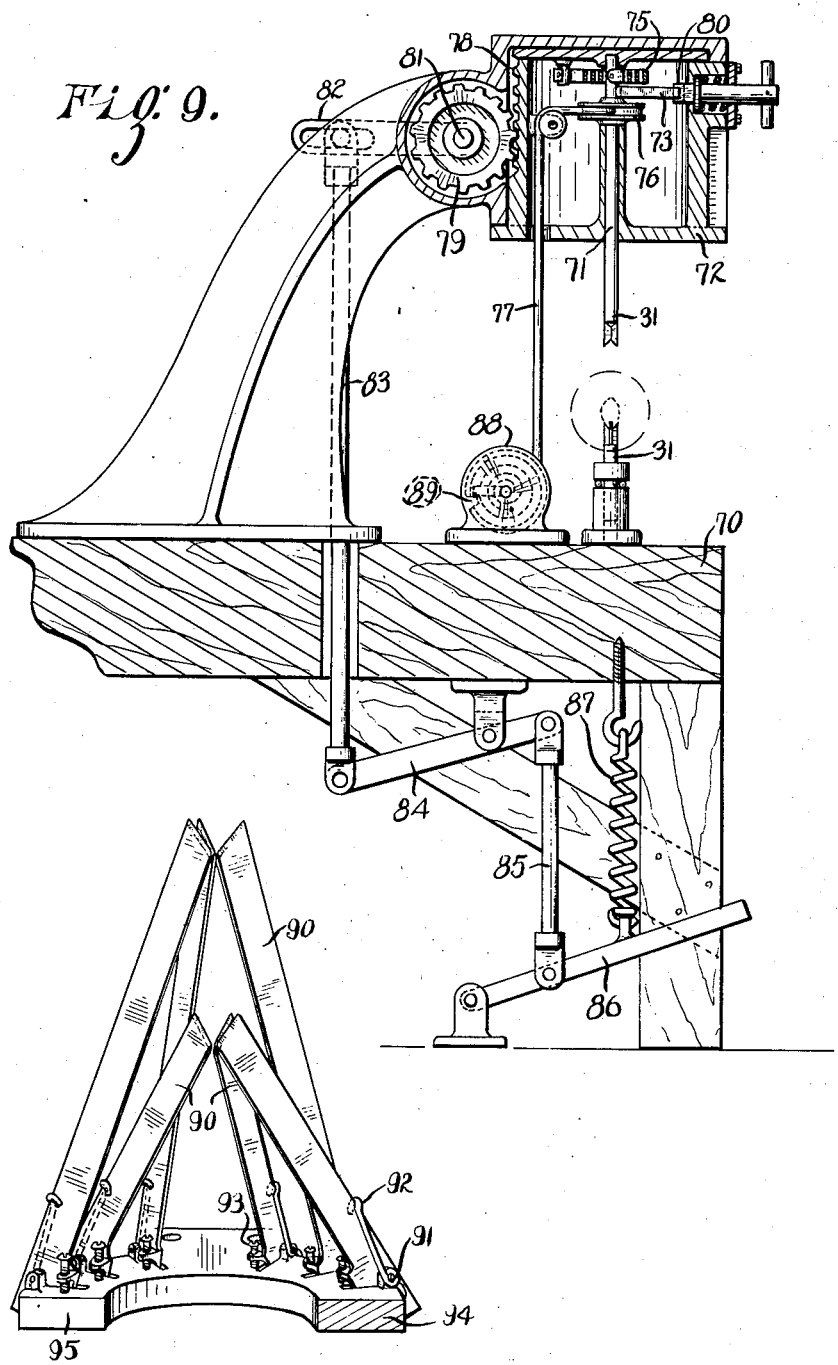

Patented June 12, 1945

2,378,101

UNITED STATES PATENT OFFICE 2,378,101

METHOD AND MEANS FOR TREATING FRUIT HAVING A PIT

Ralph Polk, Sr., and Ralph Polk, Jr., Tampa, Fla., assignors to The Polk Development Company (not incorporated), Tampa, Fla., a copartnership of Florida, composed of Ralph Polk, Sr., and Ralph Polk, Jr.

Application September 12, 1941, Serial No. 410,530

15 Claims. (Cl. 146—28)

The object of our invention is to provide an improved method and mechanism for sectionizing that type of fruit which comprises a central pit surrounded by an edible meat body, typified by the peach, and more particularly commercially useful for treating fruits of the specified type wherein the pits are relatively "free."

The accompanying drawings illustrate our invention.

Fig. 1 is a plan of a machine embodying one form of our invention;

Fig. 2 a section, on a larger scale, on line 2—2 of Fig. 1;

Fig. 3 a fragmentary aerial elevation on line 3—3 of Fig. 2;

Fig. 4 a fragmentary perspective of means capable of penetrating the meat body and firmly engaging the pit to control its rotation;

Fig. 5 an elevation on the lefthand side of Fig. 1;

Fig. 6 a fragmentary section, on a larger scale, on lines 6—6 of Fig. 1;

Fig. 7 a fragmentary elevation in partial vertical section of another embodiment of our invention;

Fig. 8 an elevation of another embodiment of our invention;

Fig. 9 a vertical section of another embodiment of our invention;

Fig. 10 a fragmentary plan showing an addition to the structure shown in Fig. 1; and Fig. 11 an axial section of the added slicer head shown in Fig. 10.

In the drawings 20 indicates a main frame in which are journalled two parallel shafts 21 and 22, each provided with a sprocket wheel 23. One of the shafts is connected so as to be driven by a suitable power train 25. Extending over the sprocket wheels 23—23 is an endless chain 26 to which are connected one or more carriages 27 slidably mounted on a suitable runway 28, the endless chain 26 and the carriage 27 forming a carrier means for receiving, holding and transporting individual fruit to be treated. Pivoted at 29 on each carriage 27 is a lever 30, the outer end of which carries a fruit-penetrating pin 31 formed at its free end so as to be capable of penetrating the fruit meat and engaging the pit of the fruit so as to hold it against rotation. The pit-engaging portion of this pin 31 may, of course, have any one of a considerable number of appropriate forms as, for instance, that shown in Fig. 4, comprising a plurality of thin blades 32, the free ends of which are tapered outwardly as shown, so that the blades, after penetrating the meat, will straddle and embrace the adjacent end of the pit. The inner arm of lever 30 is provided with a roller 33 arranged to coact with a fixed cam 34 carried by the main frame.

The fruit-engaging position of pin 31 of arm 30 is determined by the adjustable temper screw 35 in contact with an appropriate portion 36 of carriage 27, arm 30 being biased to that position by a spring 37. Also carried by carriage 27 is an arm 38 provided, at its free end, with a pin 31. The two pins 31—31, when in fruit-holding position, are in axial alignment and the adjacent portions of the two arms 30—38 are in a common plane for a reason which will appear.

Arranged radially about a portion of the path of travel of pins 31—31 are two meat slitting blades 40—40 each of which is pivotally mounted at 41 on an oscillable sleeve 42, journalled and axially held in a bracket 43 carried by the main frame.

The two slitter blades 40—40 are arranged in a common plane and each is spring biased toward the other to an inner portion by a spring 40'. The inner edge of each blade 40 is provided with a fruit pit cavity 40" somewhat longer than a normal fruit pit, and the edges 40''' of these blades are conveniently sharpened.

Sleeve 42 is longitudinally slotted in a plane 90° from the plane of the slitter blades 40—40, as indicated at 44 (Fig. 3), and the entrance end of one wall of this slot is outwardly flared to form a cam 45. Sleeve 42 is spring biased in one direction by a spring 46 anchored at a suitable point on the main frame and at its opposite end anchored on sleeve 42 in a relation to rotatively bias the sleeve in one direction. Sleeve 42 carries a stop finger 48 adapted to be engaged by a latch finger 49 carried by the shaft 50 journalled on the main frame and provided with an arm 51 with its free end arranged in the path of travel of a cam 52 carried by carriage 27.

The operation is as follows:

The endless chain 26 is driven in the direction indicated by the arrow in Fig. 1 and when the carriage 27 approaches cam 34 roller 33 will engage said cam so as to separate finger 31 of arm 30 from the finger 31 of arm 38 by an amount sufficient to permit the insertion of a fruit between the two fingers 31, and, if the operator so desires, the manual impalement of the fruit upon one or the other of pins 31. When the carriage 27 reaches the position indicated at the right of Fig. 1, roller 33, passing beyond the high point of cam 34, permits spring 37 to drive finger 31 of arm 30 toward finger 31 of arm 38 and thus impale the fruit between the two fingers 31—31, the springs 37 and blades 32 serving to firmly hold the fruit and to hold the pit against rotation.

Carriage 27, bearing its fruit, brings the fruit into contact with blades 40—40, and arm 30 passing between the tips of the blades and through the pit pocket 40″ toward slot 44 of sleeve 42 and blades 40 act to slit the meat of the fruit in a diametrical plane. At the moment when the pit lies within the pit pocket 40″, cam 52 engages arm 51 to withdraw latch finger 49 from stop 48 of sleeve 42 so that spring 46 may rotate the sleeve 42 slightly, thereby causing blades 40 to exert circumferential force upon the meat segments by slitting them circumferentially on the fruit pit so as to free the meat segments from the pit and permit them to drop into a suitable receptacle. At this moment the cammed portion 45 of slot 44 is engaged by arm 30 so that the sleeve 42 is oscillated in a reverse direction so as to stress spring 46 and permit finger 48 to pass back of latch finger 49, said latch finger being yieldingly urged to normal position by a spring 51′ (Fig. 2).

Within course of time, roller 33 comes again into contact with cam 34 whereupon fingers 31 are separated to permit the pit to drop out and to permit the insertion of another fruit.

Referring now to Fig. 7:

60 indicates a base upon which is fixed a pin 31. Aligned with this pin 31 is a similar pin 31 carried by an extended shank 61 upon which is sleeved a tube 62 which is slidably and rotatively mounted in a portion 63 of the base 60. Shank 61 projects through the adjacent end of tube 62 and interposed between said shank and tube is a spring 64 which biases tube 62 toward the pin-carrying end of shank 61. Tube 62, at its end adjacent pin 31 of shank 61, is provided with a cross arm 65 upon the outer ends of which are pivoted, at 66, two meat-slitting blades 40 similar to the blades previously described, said blades being biased toward each other by spring 40′. The outer end of shank 61 is provided with a suitable handle 67.

The operation is as follows:

A fruit having been impaled upon the fixed pin 31, preferably in the stem-blossom diameter of the fruit, the operator, grasping the handle 67, drives the pin 31 of shank 61 into the fruit and on to the upper end of the pit, thus firmly clasping the pit between the two pins 31 and holding the pit against rotation. Spring 64 may be so proportioned as to simultaneously serve to drive the slitting knives 40 through the fruit, said knives coming to rest when the pit lies in the pit pocket 40″, or the operator may shift tube 62 axially so as to drive said slitting knives to that position, whereupon tube 62 is grasped and slightly rotated on shank 61 thereby exerting circumferential forces upon the meat segments so as to rotate the said segments relative to the pit and thus free said segments.

Referring now to Fig. 8:

70 indicates a suitable base upon which is journalled a pin 31 and aligned with that pin is another pin 31, the shank 71 of which is journalled in a carriage 72 slidably mounted on base 70 axially of the two pins 31—31. Shank 71 carries a stop arm 73 arranged to coact, in both directions of rotation of shank 71, with a stop finger 74 which is a portion of carriage 72. Shank 71 is rotationally biased in one direction by a spring 75 which normally holds arm 73 in engagement with finger 74. Shank 71 carries a pulley 76 around which is wound a cord 77 in a direction such that a pull on the cord will cause rotation of shank 71, and its finger 73, in opposition to the bias of spring 75.

The operation is as follows:

Fruit to be pitted having been impaled upon one or the other of pins 31, carriage 72 is shifted to cause impalement of the fruit by the other pin 31 whereupon a sudden sharp pull upon cord 77 will rotate the fruit until rotation of the pins 31 is suddenly stopped by engagement of arm 73 with finger 74 in opposition to the pull exerted on the cord. This movement imposes upon the meat of the fruit sufficient circumferential energy to cause the fruit meat to slip circumferentially upon the pit and thus, when rotation of the pit is suddenly stopped, free the pit from the meat.

If desired, the fruit meat may be preliminarily segmented by radial slits, in which case the centrifugal force generated in the fruit meat will cause the meat segments to fly free from the fruit pit.

Referring now to Fig. 9:

The structure herein illustrated is very similar to that shown in Fig. 8, the principal difference being that cord 77 is wound upon pulley 76 in a direction to permit a pull thereon to stress spring 75 and, instead of stop finger 74, there is provided a latch finger 80. In this form, spring 75 having been stressed and restrained by latch finger 80 and the fruit having been impaled between the two fingers 31—31, the operator momentarily retracts latch finger 80 so as to permit spring 75 to set the fruit in rotation and then restores latch finger 80 to a position where it will serve as a stop finger to engage stop arm 73 and prevent further rotation, said rotation being stopped at a time when the fruit is rotating rapidly so as to obtain the benefit of the circumferential energy which has been imposed upon the fruit meat.

In order to automatically reciprocate carriage 72 and stress spring 75, carriage 72 is provided with a rack 78 which meshes with a gear 79 carried by a shaft 81 having an arm 82 connected by link 83 connected to a lever 84 which, in turn, is connected by a link 85 connected to a treadle 86 biased in one direction by a spring 87 to normally shift carriage 72 to its upper position. Cord 77, instead of being hand manipulated has one end anchored on a spring-biased drum 88 limited in one direction of rotation by a stop finger 89.

It will be readily understood that the mechanisms disclosed in Figs. 7 to 9 may be incorporated with mechanism to cause automatic operation without departing from the spirit of our invention.

If segmentation of the fruit to a greater extent than halving is desired and multiplication of the slicer blades 40 shown in Fig. 1 is deemed inadvisable, the additional segmentation may be obtained by means of a plurality of thin slicing blades 90 arranged in one or more circumferential groups, each pivoted blade being pivoted on an axis 91 arranged tangentially relative to the line of travel of the pins 31 and each urged inwardly by a spring 92, each blade being conveniently provided with a temper screw 93 to limit its inward movement and the several blades being mounted upon a ring 94 split at one side, as indicated at 95, to permit the passage of arms 30 and 38.

As indicated in Fig. 10, ring 94 may be supported on frame 20 with its axis coincident with the portion of the path of travel of the pins 31 and its slot 95 in position to permit the arms 30 and 38 to pass therethrough, thereby permitting the arms 30 and 38 to drag a fruit axially through the groups of slitting knives 90 preliminary to engagement with the slitting knives 46.

We claim as our invention:

1. The method of treating whole fruit, having a pit, which comprises, positively engaging the pit and controlling rotation thereof, and concurrently causing relative one-directional rotation between pit and entire meat and thereby breaking the natural bond between the pit and meat.

2. The method of treating whole fruit, having a pit, which comprises, slitting the meat, positively engaging and holding the pit against rotation of the pit about an axis thereof, and one-directionally shifting the entire meat circumferentially about said axis thereby breaking the natural bond between pit and meat.

3. The method of treating whole fruit, having a pit, which comprises, slitting the meat to form segments, positively engaging and holding the pit against rotation, and simultaneously shifting all the meat segments circumferentially relative to the pit thereby breaking the natural bond between pit and meat.

4. Apparatus for treating fruit, having a pit, comprising means for positively engaging and holding the pit, slitting knives arranged radially of an axis of the fruit pit, means for causing said knives to engage and slit the meat to form segments, and means for rotating said knives about said axis of the pit while said knives are in engagement with the meat and the pit is being held.

5. Apparatus for treating fruit, having a pit, comprising a main frame, a carrier movably mounted on said frame, a pair of pit-engaging members mounted on said carrier and adapted to hold the fruit by engagement with the pit thereof, two knives supported on the main frame radially of the path of travel of the pit-engaging members, and means for shifting said knives about the axis of the pit-engaging members while the knives are embedded in the meat of the fruit.

6. Apparatus of the character specified in claim 5, wherein each knife is provided with a pit cavity in its cutting edge.

7. Apparatus of the character specified in claim 5, and said means comprising, a sleeve journalled on the main frame about an axis coinciding with a part of the path of travel of the pit-engaging members, spring means biasing said sleeve in one direction about the sleeve axis, latching means releasably holding said sleeve against the bias of said spring, means carried by the carrier of the pit-engaging members for releasing said latch while the knives are embedded in the fruit meat, and means carried by said carrier for re-establishing the bias on said sleeve.

8. Apparatus of the character specified in claim 5 and said means comprising a longitudinally slotted sleeve journalled on the main frame with its axis coinciding with a part of the path of travel of the pit-engaging members and carrying said knives. the slot of said sleeve having a cammed edge cooperative with a portion of the carrier of the pit-engaging members to re-establish the bias on said sleeve.

9. Apparatus for treating whole fruit having a pit, comprising means capable of penetrating the meat body for directly engaging and holding such pit, means for severing the fruit meat on meridian planes relative to such pit, and means to cause relative circumferential movement, about a pit axis, between such pit and the entire body of meat thereby breaking the natural bond between the pit and meat.

10. Apparatus for treating whole fruit having a pit, comprising means capable of penetrating the meat body for directly engaging and holding such pit, means for severing the fruit meat on meridian planes relative to such pit, and means to cause relative circumferential movement, about a pit axis, between such pit and meat severing means while the pit is being directly engaged and held and the several segments of meat are simultaneously engaged by the severing means.

11. Apparatus for treating whole fruit having a pit, comprising a pair of aligned pit-engaging members, one movable relative to the other to cause fruit meat penetration and pit engagement, fruit-meat severing means, coordinated with the axis of the pit-engaging members, adapted to sever the meat on a radial plane relative to the pit, and means by which relative angular movement may be caused between the pit-engaging members and meat-severing means, about said axis while the several meat segments are simultaneously engaged by the severing means.

12. Apparatus for treating fruit having a pit, comprising, a main frame, fruit-meat penetrating and pit-engaging elements fixed on the main frame, a second meat-penetrating and pit-engaging member alignable with said first members to cause meat penetration and pit engagement, a carrier for said second element movably mounted in the main frame to cause fruit penetration, fruit-meat slitting means movable to and from meat-slitting relation with fruit when its pit is engaged between the pit-engaging members, and means by which said meat-slitting means may be revolved about the axis of the fruit pit when so engaged.

13. Apparatus for treating fruit, having a pit, comprising, two aligned plungers having diameters substantially less than a fruit diameter and their free ends facing each other, one of said plungers being axially movable relative to the other and one of said plungers having, at its free end, a plurality of thin pit-engaging blades extending axially of the plunger with free ends formed to engage the fruit pit.

14. Apparatus for treating fruit, having a pit, comprising, two aligned plungers having diameters substantially less than a fruit diameter and their free ends facing each other, one of said plungers being axially movable relative to the other and one of said plungers having, at its free end, a plurality of thin pit-engaging blades extending axially of the plunger and arranged in a circular group around the axis of the plunger with their free ends outwardly tapered from the group axis.

15. Apparatus for treating whole fruit, having a pit, comprising, two aligned plungers having diameters substantially less than a fruit diameter with their free ends facing each other, and so formed as to penetrate the meat and engage the pit and hold the same against rotation relative to the plungers, and means for causing relative rotation between the pit and all the fruit meat wholly surrounding the pit.

RALPH POLK, Sr.
RALPH POLK, Jr.